(12) United States Patent
Watanabe et al.

(10) Patent No.: US 9,404,755 B2
(45) Date of Patent: Aug. 2, 2016

(54) SENSOR HAVING A PLURALITY OF MOUNTING BOARDS ON WHICH SENSOR COMPONENTS ARE MOUNTED, AN ELECTRONIC APPARATUS HAVING THE SENSOR, AND A MOVING OBJECT HAVING THE SENSOR

(71) Applicant: Seiko Epson Corporation, Tokyo (JP)

(72) Inventors: Jun Watanabe, Matsumoto (JP); Shinji Nishio, Suwa (JP)

(73) Assignee: Seiko Epson Corporation (JP)

( * ) Notice: Subject to any disclaimer, the term of this patent is extended or adjusted under 35 U.S.C. 154(b) by 269 days.

(21) Appl. No.: 14/138,651

(22) Filed: Dec. 23, 2013

(65) Prior Publication Data

US 2014/0182376 A1    Jul. 3, 2014

(30) Foreign Application Priority Data

Dec. 27, 2012   (JP) ................ 2012-284512

(51) Int. Cl.
| | |
|---|---|
| *G01D 11/30* | (2006.01) |
| *G01C 21/16* | (2006.01) |
| *G01D 11/24* | (2006.01) |
| *G01C 25/00* | (2006.01) |

(52) U.S. Cl.
CPC ............ *G01C 21/16* (2013.01); *G01C 25/00* (2013.01); *G01D 11/245* (2013.01)

(58) Field of Classification Search
CPC .... G01C 21/16; G01C 25/00; G01C 19/5783; G01C 21/265; G01C 19/5769; G01C 19/5663; G01C 19/5628; G01D 11/245; G01D 11/30; G01P 1/02; G01P 1/023; G01P 15/18; G01P 15/097

USPC ............. 73/510, 866.5, 488, 431, 493
See application file for complete search history.

(56) References Cited

U.S. PATENT DOCUMENTS

| | | | | |
|---|---|---|---|---|
| 4,711,125 A | * | 12/1987 | Morrison | G01P 15/18 73/178 R |
| 5,173,745 A | * | 12/1992 | Hanse | G01C 19/70 356/476 |
| 6,305,223 B1 | | 10/2001 | Matsumoto et al. | |
| 6,388,887 B1 | | 5/2002 | Matsumoto et al. | |
| 6,463,804 B2 | | 10/2002 | Matsumoto et al. | |
| 6,561,030 B2 | | 5/2003 | Matsumoto et al. | |
| 6,566,742 B1 | | 5/2003 | Matsumoto et al. | |
| 7,040,922 B2 | | 5/2006 | Harney et al. | |
| 7,291,023 B1 | * | 11/2007 | Still | B60R 21/01 439/65 |
| 2003/0070483 A1 | * | 4/2003 | Mueller | G01C 19/5783 73/493 |

(Continued)

FOREIGN PATENT DOCUMENTS

| | | |
|---|---|---|
| JP | 05-340960 | 12/1993 |
| JP | 07-306047 | 11/1995 |

(Continued)

*Primary Examiner* — Peter Macchiarolo
*Assistant Examiner* — David L Singer
(74) *Attorney, Agent, or Firm* — Harness, Dickey & Pierce, P.L.C.

(57) ABSTRACT

A sensor includes a plurality of mounting boards with sensor components mounted on a mounting surface, and a support member provided with fixation surfaces adapted to fix the plurality of mounting boards, the sensor components are disposed between the mounting boards and the support member, and the mounting boards are connected to each other with a connection member.

11 Claims, 10 Drawing Sheets

(56) References Cited

U.S. PATENT DOCUMENTS

| | | | |
|---|---|---|---|
| 2004/0178344 A1* | 9/2004 | Taniguchi | G01J 5/02 250/338.3 |
| 2008/0117324 A1* | 5/2008 | Minamio | H04N 5/2254 348/340 |
| 2008/0152272 A1* | 6/2008 | Debrailly | F16C 19/54 384/448 |
| 2009/0056446 A1* | 3/2009 | Cluff | G01P 1/023 73/514.16 |
| 2009/0056447 A1* | 3/2009 | Berthold | G01H 9/006 73/514.26 |
| 2009/0152653 A1* | 6/2009 | Borzabadi | B81B 7/0074 257/415 |
| 2009/0255335 A1 | 10/2009 | Fly et al. | |
| 2009/0308157 A1* | 12/2009 | Eriksen | G01C 21/16 73/504.04 |
| 2010/0139400 A1* | 6/2010 | Morii | G01C 19/5755 73/504.12 |
| 2011/0185812 A1* | 8/2011 | Raschke | B23K 26/0021 73/431 |

FOREIGN PATENT DOCUMENTS

| | | |
|---|---|---|
| JP | 11-211481 | 8/1999 |
| JP | 11-289141 | 10/1999 |
| JP | 2001-102746 A | 4/2001 |
| JP | 2002-009228 A | 1/2002 |
| JP | 2002-277484 A | 9/2002 |
| JP | 2005-197493 A | 7/2005 |

* cited by examiner

SENSOR HAVING A PLURALITY OF MOUNTING BOARDS ON WHICH SENSOR COMPONENTS ARE MOUNTED, AN ELECTRONIC APPARATUS HAVING THE SENSOR, AND A MOVING OBJECT HAVING THE SENSOR

BACKGROUND

1. Technical Field

The present invention relates to a sensor, an electronic apparatus, and a moving object using the sensor.

2. Related Art

There has been known such a sensor unit as disclosed in, for example, U.S. Pat. No. 7,040,922 (Document 1). The sensor unit described in Document 1 has a mounting member and sensor devices, wherein the mounting member has a cuboid shape and three surfaces perpendicular to each other, and the sensor devices are mounted respectively on the three surfaces.

However, in the sensor unit of Document 1, the sensor devices (sensor components) are exposed to the outside of the sensor unit. Therefore, there is a problem that a variety of apparatuses such as a manufacturing apparatus or an operator has direct contact with the sensor device when manufacturing or checking operation of the sensor unit or when mounting the sensor unit into another electronic apparatus, and the sensor device is damaged due to the contact to make it unachievable to exert the excellent detection accuracy.

SUMMARY

An advantage of some aspects of the invention is to solve at least a part of the problems described above, and the invention can be implemented as the following aspects or application examples.

Application Example 1

This application example is directed to a sensor including a plurality of mounting boards with sensor components which are mounted on mounting surfaces thereof, and a support member provided with fixation surfaces adapted to fix the plurality of mounting boards, the sensor components are disposed between the mounting boards and the support member, and the mounting boards are connected to each other with a connection member.

According to the sensor described in this application example, since the sensor components are disposed on the support member side of the mounting boards, damages of the sensor components or the like can be prevented when manufacturing the sensor or checking the operation of the sensor. Thus, the sensor with improved reliability can be provided.

Further, since the plurality of sensor components are disposed on the support member side of the plurality of mounting boards disposed along the fixation surfaces of the support member, damages of the sensor components or the like can be prevented when manufacturing the sensor or checking the operation of the sensor, and thus the sensor with improved reliability can be provided.

Application Example 2

This application example is directed to the sensor according to the application example described above, wherein the mounting boards are disposed so that a side surface of an end portion of one of the mounting boards is opposed to a mounting surface of another of the mounting boards, and the mounting boards are connected to each other with the connection member.

According to this application example, since the end portion of one of the mounting boards is disposed so as to be opposed to the mounting surface of another of the mounting boards, the connection can be achieved using the connection member while providing the electrical connection. Thus, the rigidity between the mounting boards fixed to each other is improved, and the fixation of the mounting boards can stably and continuously be maintained. Thus, it is possible to perform stable detection for a long period of time.

Application Example 3

This application example is directed to the sensor according to the application example described above, wherein the support member has the fixation surfaces intersecting with each other.

According to this application example, by using, for example, an angular velocity sensor or an acceleration sensor as the sensor components, and disposing the sensor components to the fixation surfaces intersecting with each other, the angular velocities around the plurality of axes intersecting with each other, or the plurality of axes perpendicular to each other, or the acceleration can accurately be detected.

Application Example 4

This application example is directed to the sensor according to the application example described above, wherein the support member has a cuboid shape.

According to this application example, since the surfaces constituting the cuboid can be used as the fixation surfaces, it is easy to make the normal lines of the fixation surfaces perpendicular to each other, and by using, for example, an angular velocity sensor or an acceleration sensor as the sensor components, and disposing the sensor components to the fixation surfaces, the angular velocities around the plurality of axes, or the acceleration can accurately be detected.

Application Example 5

This application example is directed to the sensor according to the application example described above, wherein the support member is provided with a component housing section, and the component housing section houses at least a part of the sensor components.

According to this application example, a through hole or a clearance is provided, for example, as the component housing section, and thus, it becomes possible to house at least a part of the sensor components in the component housing section, which can make a contribution to the miniaturization and height reduction of the module.

Application Example 6

This application example is directed to the sensor according to the application example described above, wherein a metal material is used for the support member.

According to this application example, by forming the support member with a material having a high electrical conductivity such as a metal material, it is possible to block the radiation noise generated by, for example, the microcontroller mounted on the mounting surface using the support member. Therefore, it becomes possible to prevent such radiation noise from reaching the sensor components mounted on other mounting surfaces and exerting a harmful influence.

Application Example 7

This application example is directed to the sensor according to the application example described above, wherein the plurality of mounting boards include a first mounting board, a second mounting board, and a third mounting board, the sensor components are mounted on each of the mounting surfaces of the first mounting board, the second mounting board, and the third mounting board, and the sensor components are disposed so that detection axes of the respective sensor components intersect with each other.

According to this application example, by using, for example, an angular velocity sensor or an acceleration sensor as the sensor components, and disposing the sensor components to the fixation surfaces intersecting with each other, the angular velocities around the three axes intersecting with each other, or the acceleration can accurately be detected.

Application Example 8

This application example is directed to the sensor according to the application example described above, wherein each of the sensor components is at least one of an angular velocity sensor and an acceleration sensor.

According to this application example, by using the angular velocity sensor or the acceleration sensor as the sensor components, and mounting the sensor components on the first through third mounting surfaces intersecting with each other or perpendicular to each other, the module capable of detecting the angular velocities around a plurality of axes or the acceleration can be provided.

Application Example 9

This application example is directed to an electronic apparatus including the sensor according to any one of the application examples described above.

According to this application example, since the sensor described above is included, an electronic apparatus capable of exerting excellent reliability can be provided.

Application Example 10

This application example is directed to a moving object including the sensor according to any one of the application examples described above.

According to this application example, since the sensor described above is included, a moving object capable of exerting excellent reliability can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a sensor, an electronic apparatus, and a moving object according to the invention will be explained in detail based on some preferred embodiments shown in the accompanying drawings.

1. Sensor (Sensor Module)

Firstly, a sensor according to an embodiment of the invention will be explained. It should be noted that the descriptions will hereinafter be presented defining the upper side of the drawings in FIGS. 1A, 1B, and 5 as an "upper side" and the lower side of the drawings as a "lower side" for the sake of convenience of explanation. Further, as shown in FIGS. 1A and 1B, the three axes perpendicular to each other are defined as an "x axis," a "y axis," and a "z axis," respectively.

First Embodiment

Figure 1A:
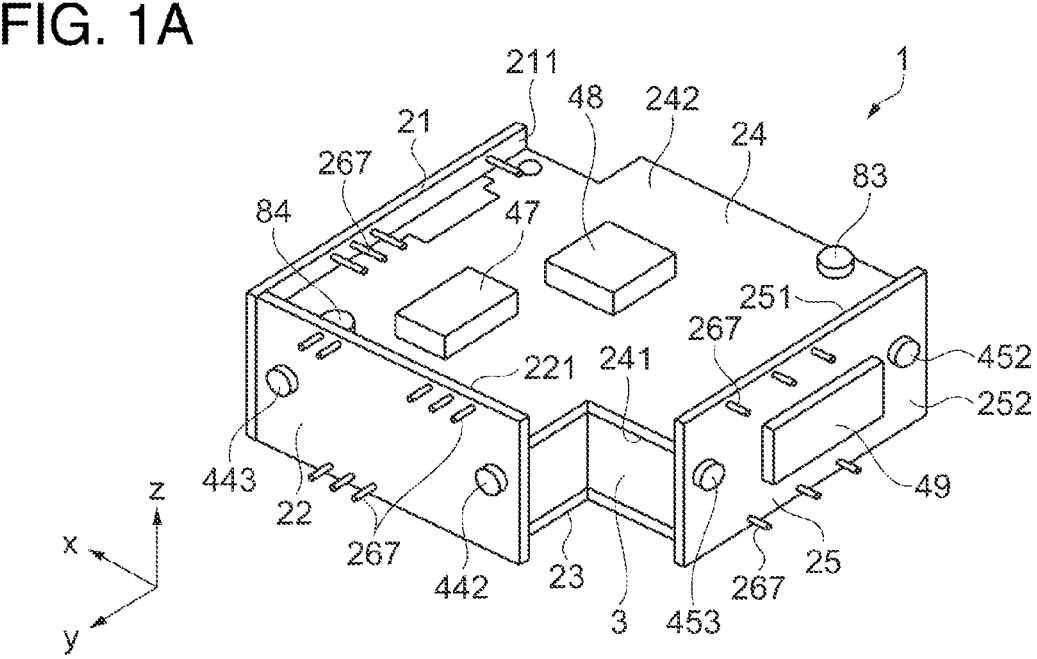
FIGS. 1A and 1B are perspective views showing a sensor according to a first embodiment of the invention.
Figure 1B:
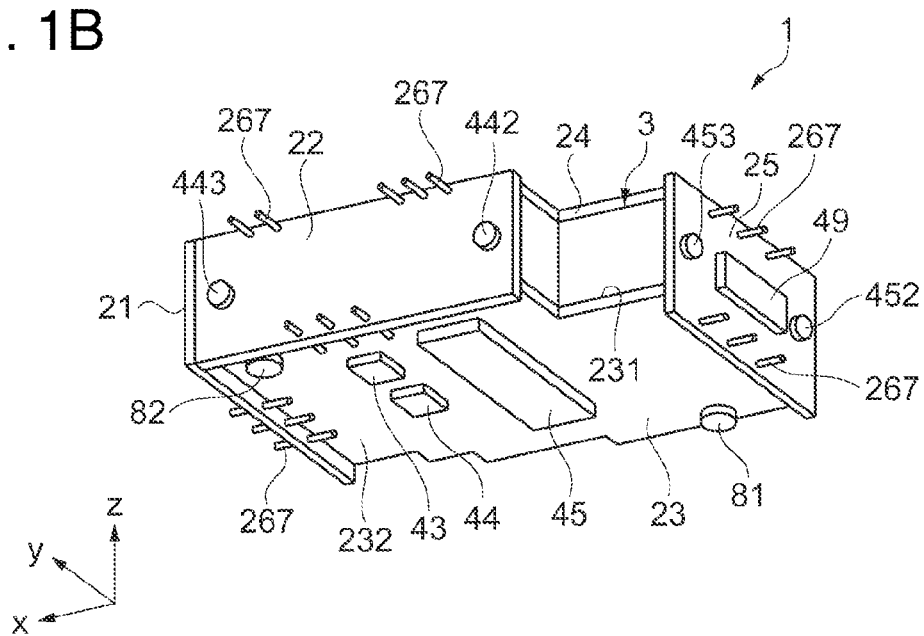
Figure 2A:
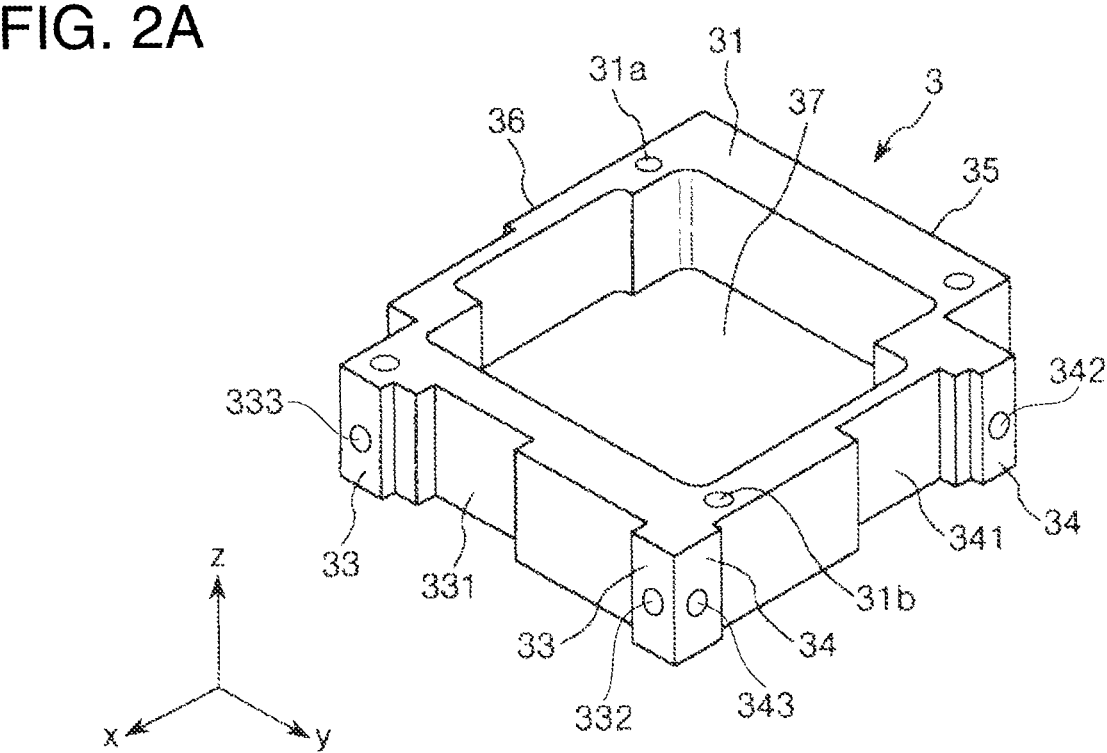
FIGS. 2A and 2B are perspective views showing a support member provided to the sensor shown in FIGS. 1A and 1B.
Figure 2B:
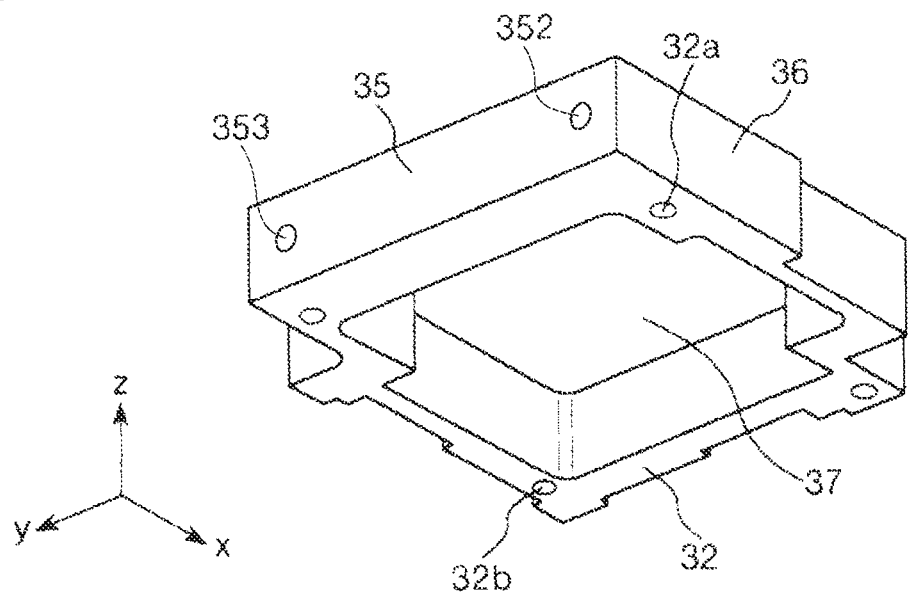
Figure 3:
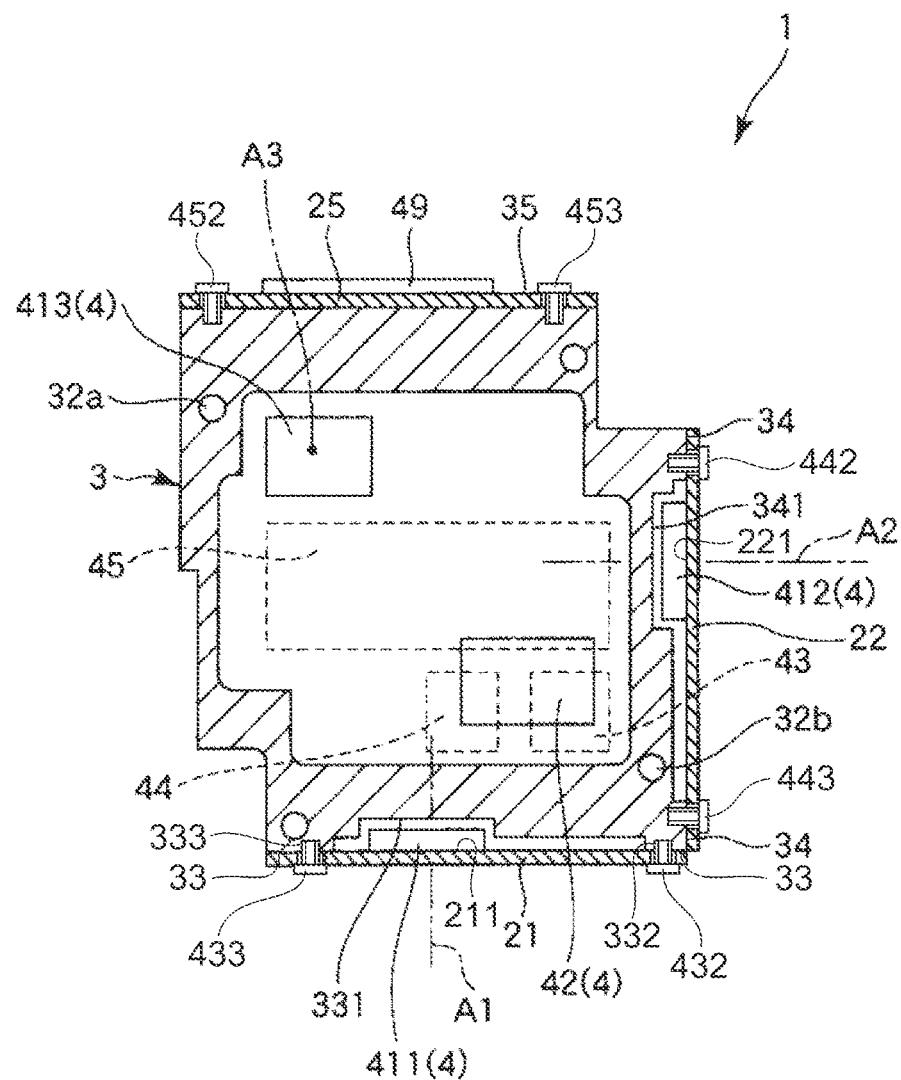
FIG. 3 is a lateral cross-sectional view of the sensor shown in FIGS. 1A and 1B.
Figure 3:
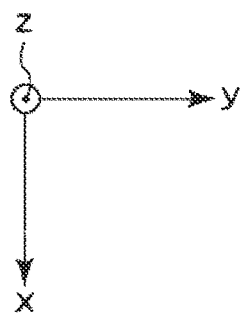
Figure 4:
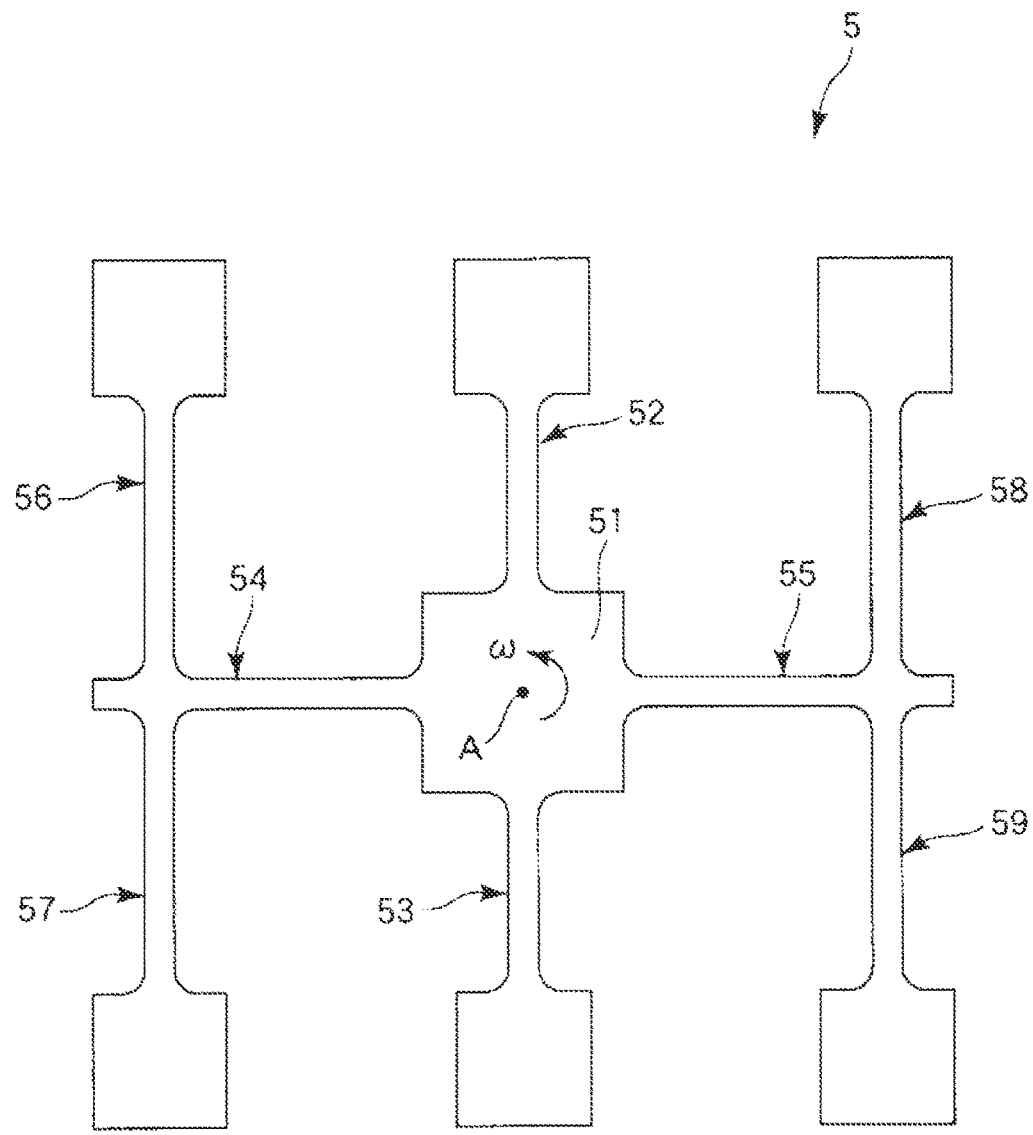
FIG. 4 is a plan view showing an example of an angular velocity sensor provided to the sensor shown in FIGS. 1A and 1B.

FIGS. 1A and 1B are perspective views showing the sensor according to a first embodiment of the invention, FIGS. 2A and 2B are perspective views showing a support member provided to the sensor shown in FIGS. 1A and 1B, FIG. 3 is a lateral cross-sectional view of the sensor shown in FIGS. 1A and 1B, and FIG. 4 is a plan view showing an example of an angular velocity sensor provided to the sensor shown in FIGS. 1A and 1B.

A sensor 1 according to the present embodiment is a three-axis gyro sensor module provided with angular velocity sensors 411, 412, and 413 as sensor components 4, and capable of detecting the angular velocities around the x axis, the y axis, and the z axis perpendicular to each other, respectively. Such a sensor 1 as described above is superior in convenience, and can preferably be used, for example, for motion trace, motion tracking, a motion controller, and pedestrian dead reckoning (PDR).

As shown in FIGS. 1A and 1B, the sensor 1 includes mounting boards on which the sensor components 4 such as the angular velocity sensors 411 through 413 are mounted, and a support member 3 for supporting (fixing) the mounting boards. It should be noted that it is possible for the sensor 1 to further include a casing for housing the mounting boards and the support member 3. Hereinafter, each of these members will sequentially be explained.

Mounting Board

The mounting boards are formed of a plurality of rigid boards (hard boards), which are hard and difficult to deform. As such a mounting board, a hard layer such as a glass epoxy board can be used. The mounting boards include a first rigid board 21, a second rigid board 22, a third rigid board 23, a fourth rigid board 24, and a fifth rigid board 25.

Both end portions of the first rigid board 21, both end portions of the second rigid board 22, both end portions (both corner portions in a diagonal relationship) of the third rigid board 23, both end portions (both corner portions in a diagonal relationship) of the fourth rigid board 24, and both end portions of the fifth rigid board 25 are each provided with a hole (not shown). These holes are used for fixing the first through fifth rigid boards 21 through 25 to the support member 3. It should be noted that each of the holes has a structure of penetrating from one side to the other side.

Further, each of the rigid boards, the first rigid board 21 through the fifth rigid board 25 (thereinafter also referred to as "each of the rigid boards 21 through 25"), is provided with a conductor pattern (not shown), and the plurality of sensor components 4 are electrically connected to each other via the conductive pattern in an appropriate manner. It should be noted that for the sake of convenience of explanation, the surface (the surface on the opposite side to the support member 3 side) of each of the rigid boards 21 through 25 shown in FIGS. 1A and 1B is hereinafter referred to as a "reverse mounting surface," and the surface on the support member 3 side in FIGS. 1A and 1B, which is an opposite side surface of the "reverse mounting surface," is hereinafter referred to as an "obverse mounting surface."

As shown in FIG. 3, the first rigid board 21 is fixed by screws 432, 433 so that a obverse mounting surface 211 adheres to a side surface 33 of the support member 3. Further, as shown in FIG. 3, the second rigid board 22 is fixed by screws 442, 443 so that an obverse mounting surface 221 adheres to a side surface 34 of the support member 3. Further, as shown in FIG. 1B, the third rigid board 23 is fixed with screws 81, 82 so that an obverse mounting surface 231 adheres to a lower surface 32 (see FIG. 2B) of the support member 3. Further, as shown in FIG. 1A, the fourth rigid board 24 is fixed by screws 83, 84 so that an obverse mounting surface 241 adheres to an upper surface 31 (see FIG. 2A) of the support member 3. Further, as shown in FIGS. 1A and 1B, the fifth rigid board 25 is fixed by screws 452, 453 so that an obverse mounting surface 251 adheres to a side surface 35 (see FIG. 2B) of the support member 3.

Among the rigid boards 21 through 25 fixed to the support member 3, the third rigid board 23 and the fourth rigid board 24 (one part of the mounting boards) are configured so that the side surfaces of the end portions of the one part of the mounting boards are opposed to the obverse mounting surfaces 211, 221, and 251 of the first rigid board 21, the second rigid board 22, and the fifth rigid board 25 (the other part of the mounting boards) intersecting with the one part of the mounting boards, respectively. In other words, the first rigid board 21, the second rigid board 22, and the fifth rigid board 25 are disposed so as to overlap the third rigid board 23, and the fourth rigid board 24, when viewed from the side surface side (in the x axis and y axis directions).

By adopting such a configuration as described above, it is possible to achieve the electrical connection between the rigid boards 21 through 25 using pin headers 267 as shown in FIGS. 1A and 1B. The pin headers 267 are each, for example, a pin member obtained by providing conductive metal plating to a copper alloy, and in the present embodiment, are inserted into insertion holes (not shown) provided to the first rigid board 21, the second rigid board 22, and the fifth rigid board 25. Further, the pin headers 267 each have one end located in one of the first rigid board 21, the second rigid board 22, and the fifth rigid board 25, and the other end located in one of the third rigid board 23 and the fourth rigid board 24, and the ends are connected to the conductive patterns of the respective rigid boards 21 through 25 using solder (not shown) or the like.

By performing the connection using the pin headers 267 in such a manner as described above, the rigidity between the rigid boards 21 through 25 fixed to each other rises, and it becomes possible to stably maintain the fixation state of the rigid boards 21 through 25. Thus, it is possible to perform stable detection for a long period of time.

The mounting boards are hereinabove explained. By using the rigid boards 21 through 25, it becomes easy to fix the rigid boards 21 through 25 to the support member 3. Further, since the rigid boards 21 through 25 are connected in a lump by the pin headers 267, the fixation of the mounting boards to the support member 3 can easily, and solidly be performed with improved rigidity from this point of view. Further, by mounting the sensor components 4 on the rigid boards 21 through 23, unwanted vibrations of the sensor components 4 (in particular the angular velocity sensors 411 through 413) can be suppressed, and thus the detection accuracy of the sensor 1 is improved.

It should be noted that each of the rigid boards 21 through 25 is provided with a ground layer (not shown), and the ground layer exerts the function of blocking the external magnetic field. Therefore, regarding the sensor components 4 located inside (on the support member 3 side) of the rigid boards 21 through 25, the influence of the external magnetic field can be eliminated.

Further, in order to make it easy to perform positioning, temporary fixation, and so on when connecting the rigid boards 21 through 25 to the support member 3, it is also effective to adopt a configuration of providing the rigid boards 21 through 25 with pin holes other than the holes described above, and inserting positioning pins, which are provided to the support member surface at the opposed positions, into the pin holes.

Sensor Components

As shown in FIG. 3, the plurality of sensor components 4 are mounted on the rigid boards 21 through 25. On the rigid boards 21 through 25, the three single-axis angular velocity sensors 411, 412, and 413, and a three-axis acceleration sensor 42 are mounted as the sensor components 4. Further, on the rigid boards 21 through 25, there are mounted a power supply circuit 43 for driving the sensor components 4 (the angular velocity sensors 411 through 413, the acceleration sensor 42) and so on, an amplifier circuit 44 for amplifying the output signals from the sensor components 4, an analog/digital conversion circuit 45 for converting the analog signals thus amplified by the amplifier circuit 44 into digital signals, a microcontroller (not shown) for performing desired control, a nonvolatile memory 47 (see FIG. 1A) such as an EEPROM, a direction sensor (a magnetic sensor) 48 (see FIG. 1A) for detecting the direction, and a connector (an interface connector) 49 for outputting the signals.

The arrangement of these sensor components 4 and electronic components will hereinafter be explained in detail with reference to FIGS. 1A, 1B, and 3.

First Rigid Board 21

On the obverse mounting surface 211 of the first rigid board 21, there is mounted the angular velocity sensor 411 for detecting the angular velocity around the x axis.

Second Rigid Board 22

On the obverse mounting surface 221 of the second rigid board 22, there is mounted the angular velocity sensor 412 for detecting the angular velocity around the y axis.

Third Rigid Board 23

On the obverse mounting surface 231 of the third rigid board 23, there are mounted the angular velocity sensor 413 for detecting the angular velocity around the z axis, and the acceleration sensor 42. Further, on a reverse mounting surface 232, there are mounted the power supply circuit 43, the amplifier circuit 44, and the analog/digital conversion circuit 45. It should be noted that although it is also possible to mount the angular velocity sensor 413 and the acceleration sensor 42 on the reverse mounting surface 232, and to mount the power supply circuit 43, the amplifier circuit 44, and the analog/digital conversion circuit 45 on the obverse mounting surface 231, in comparison between the both configurations, the former configuration is more preferable.

Here, the analog/digital conversion circuit 45 is larger in size than the other electronic components (the power supply circuit 43 and the amplifier circuit 44) mounted on the reverse mounting surface 232. Therefore, it is preferable to dispose the analog/digital conversion circuit 45 at the center portion of the reverse mounting surface 232. Thus, it is possible to effectively use the analog/digital conversion circuit 45 as a reinforcement member for reinforcing the strength of the third rigid board 23. Therefore, the unwanted vibration due to the flexural deformation of the third rigid board 23 can be suppressed, the unwanted vibration can be prevented from being transmitted to the angular velocity sensors 411 through 413, and therefore the accuracy of the detection of the angular velocity by the angular velocity sensors 411 through 413 (in particular the angular velocity sensor 413 mounted on the third rigid board 23) is improved.

Further, the acceleration sensor 42 is preferably disposed in an edge portion (in particular in the vicinity of either one of the holes, except a part overlapping the lower surface 32 of the support member 3) of the obverse mounting surface 231. As described later, the third rigid board 23 is supported by the lower surface 32 (see FIG. 2B) of the support member 3 in the edge portion, and is fixed to the support member 3 with the screws 81, 82 through the holes. Therefore, it is hard for the edge portion of the third rigid board 23 to be deformed, and therefore the unwanted vibration is difficult to occur. Therefore, by disposing the acceleration sensor 42 at such a place, the acceleration can more accurately be detected.

Fourth Rigid Board 24

On the obverse mounting surface 241 of the fourth rigid board 24, there is mounted the microcontroller (not shown), and on a reverse mounting surface 242, there are mounted the nonvolatile memory 47 and the direction sensor 48. Here, the microcontroller is larger in size than the other electronic components (the nonvolatile memory 47 and the direction sensor 48) mounted on the fourth rigid board 24. Therefore, it is preferable to dispose the microcontroller at the center portion of the obverse mounting surface 241. Thus, it is possible to effectively use the microcontroller as a reinforcement member for reinforcing the strength of the fourth rigid board 24. Therefore, the unwanted vibration due to the flexural deformation of the fourth rigid board 24 can be suppressed, and the unwanted vibration can be prevented from being transmitted to the angular velocity sensors 411 through 413, and therefore the accuracy of the detection of the angular velocity by the angular velocity sensors 411 through 413 is improved.

Further, since the radiation noise generated by the microcontroller can be blocked by the ground layer of the fourth rigid board 24, by mounting the direction sensor 48 on the mounting surface opposite to the surface on which the microcontroller is mounted, the radiation noise can effectively be prevented from reaching the direction sensor 48 to thereby exert a harmful influence on the direction sensor 48. Therefore, the detection accuracy of the direction sensor 48 can be improved.

Fifth Rigid Board 25

On a reverse mounting surface 252 of the fifth rigid board 25, there is mounted the connector 49.

Hereinabove, the arrangement of the sensor components 4 and the electronic components is described in detail.

In this configuration, an analog circuit including the power supply circuit 43, the amplifier circuit 44, and the analog/digital conversion circuit 45 is provided to the third rigid board 23 in a lump, and a digital circuit including the microcontroller is provided to the fourth rigid board 24 in a lump. Therefore, it is possible to inhibit the high-frequency noise generated by the digital circuit from propagating to the analog circuit, and it is possible to exert excellent reliability and detection accuracy.

The angular velocity sensors 411 through 413 are not particularly limited providing the angular velocity can be detected, and known single-axis angular velocity sensors can be used therefor. As such angular velocity sensors 411 through 413, an angular velocity sensor (a gyro sensor) having a gyro element 5 shown in FIG. 4, for example, can be used.

Such a gyro element 5 as shown in FIG. 4 is formed of a quartz crystal (a piezoelectric material). Further, the gyro element 5 includes a base section 51, a pair of detecting vibrator arms 52, 53 extending in a vertical direction of the sheet of the drawing from both sides of the base section 51, a pair of connection arms 54, 55 extending in a lateral direction of the sheet from both sides of the base section 51, and pairs of driving vibrator arms 56, 57, 58, and 59 extending in the vertical direction of the sheet from both sides of the respective tip portions of the connection arms 54, 55. Further, the surface of each of the detecting vibrator arms 52, 53 is provided with a detecting electrode (not shown), and the surface of each of the driving vibrator arms 56, 57, 58, and 59 is provided with a driving electrode (not shown).

In such a gyro element 5, when the angular velocity ω around the normal line (a detection axis) A of the gyro element 5 is applied in the condition in which a voltage is applied to driving electrodes to thereby make the driving vibrator arms 56, 58 and the driving vibrator arms 57, 59 vibrate so as to repeat to come closer to and get away from each other, the Coriolis force is applied to the gyro element 5, and the vibration of the detecting vibrator arms 52, 53 is excited. Then, by detecting the distortion in the detecting vibrator arms 52, 53, which is caused by the vibration of the detecting vibrator arms 52, 53, by the detecting electrodes, the angular velocity applied to the gyro element 5 can be obtained.

Support Member

As shown in FIGS. 2A, 2B, and 3, the support member 3 has a roughly cuboid shape, and has the upper surface 31 and the lower surface 32 disposed so as to be opposed to each other, and the four side surfaces 33, 34, 35, and 36 connecting the upper surface 31 and the lower surface 32 to each other. In such a support member 3 as described above, at least the lower surface 32, the side surface 33, and the side surface 34 are formed accurately so as to have the respective normal lines perpendicular to each other. In other words, the lower surface 32, the side surface 33, and the side surface 34 are formed accurately so as to be perpendicular to each other.

As described later, since the side surfaces 33, 34 and the lower surface 32 are surfaces, to which the first through third rigid boards 21 through 23 having the angular velocity sensors 411 through 413 mounted respectively thereon are fixed, by forming the side surfaces 33, 34 and the lower surface 32 so as to be perpendicular to each other, the angular velocity sensors 411 through 413 can accurately and correctly be arranged with respect to each of the x axis, the y axis, and the z axis. Therefore, according to the sensor 1, the angular velocities around the respective axes can accurately be detected.

Side Surface 33

The side surface 33 constitutes a fixation surface (a first fixation surface) for fixing the first rigid board 21. The first rigid board 21 is fixed to the side surface 33 in a state in which the obverse mounting surface 211 faces to the support member 3 (inside). Specifically, the support member 3 has two screw holes 332, 333 disposed respectively in the both end portions of the side surface 33. The holes (not shown) provided to the first rigid board 21 are opposed respectively to the screw holes 332, 333, and the first rigid board 21 is fixed to the side surface 33 with the screws 432, 433.

It should be noted that it is also possible to adopt a configuration in which the outer diameter of the screws 432, 433 in the part to be inserted into the holes provided to the first rigid board 21 is determined so as to fit (without a gap) the inner diameter of the holes provided to the first rigid board 21. By adopting such a configuration as described above, it is possible to fix the first rigid board 21 to the side surface 33 while performing the positioning of the first rigid board 21 with respect to the side surface 33. In particular, by forming the screw holes 332, 333 in the both end portions of the side surface 33, the long distance between the screw holes 332, 333 is realized to thereby make it possible to perform the positioning of the first rigid board 21 with higher accuracy. This applies to the second through fifth rigid boards 22 through 25 described later in a similar manner.

It is preferable to additionally use bonding with an adhesive in fixing the first rigid board 21 to the side surface 33. Thus, it is possible to more solidly fix the first rigid board 21 to the side surface 33. This applies to the second through fifth rigid boards 22 through 25 described later in a similar manner.

Further, the support member 3 has a clearance 331 in the side surface 33. The clearance 331 is formed so as to correspond to the position and the outer shape of the angular velocity sensor 411, and in the state in which the first rigid board 21 is fixed to the side surface 33, the angular velocity sensor 411 is housed in the clearance 331. In other words, it is possible to make the clearance 331 function as a clearance for preventing the support member 3 and the angular velocity sensor 411 from having contact with each other.

Further, it is also possible to bond a top surface (a surface on an opposite side to the surface mounted on the first rigid board 21) of the sensor component 4 and a surface of the clearance 331 of the support member 3 to each other with an adhesive or the like. By adopting such a configuration as described above, tight bonding between the sensor component 4 and the support member 3 can be realized. By forming such a clearance 331 as described above, it is possible to effectively use the internal space of the support member 3, and at the same time achieve miniaturization of the sensor 1.

Side Surface 34

The side surface 34 constitutes a fixation surface (a second fixation surface) for fixing the second rigid board 22. The second rigid board 22 is fixed to the side surface 34 in a state in which the obverse mounting surface 221 faces to the support member 3 (inside). Specifically, the support member 3 has two screw holes 342, 343 disposed respectively in the both end portions of the side surface 34. The holes (not shown) provided to the second rigid board 22 are opposed respectively to the screw holes 342, 343, and the second rigid board 22 is fixed to the side surface 34 with the screws 442, 443.

Further, the support member 3 has a clearance 341 in the side surface 34. The clearance 341 is formed so as to correspond to the position and the outer shape of the angular velocity sensor 412, and in the state in which the second rigid board 22 is fixed to the side surface 34, the angular velocity sensor 412 is housed in the clearance 341. In other words, it is possible to make the clearance 341 function as a clearance for preventing the support member 3 and the angular velocity sensor 412 from having contact with each other.

Further, it is also possible to bond a top surface (a surface on an opposite side to the surface mounted on the second rigid board 22) of the sensor component 4 and a surface of the clearance 341 of the support member 3 to each other with an adhesive or the like. By adopting such a configuration as described above, tight bonding between the sensor component 4 and the support member 3 can be realized. By forming such a clearance 341 as described above, it is possible to effectively use the internal space of the support member 3, and at the same time achieve miniaturization of the sensor 1.

Side Surface 35

The side surface 35 constitutes a fixation surface for fixing the fifth rigid board 25. The fifth rigid board 25 is fixed to the side surface 35 in a state in which the obverse mounting surface 251 faces to the support member 3 (inside). In other words, the fifth rigid board 25 is fixed to the side surface 35 in a state in which the connector 49 is exposed to the outside of the sensor 1. Specifically, the support member 3 has two screw holes 352, 353 disposed in the both end portions of the side surface 35, the holes provided to the fifth rigid board 25 are opposed respectively to the screw holes 352, 353, and the fifth rigid board 25 is fixed to the side surface 35 with the screws 452, 453.

Lower Surface 32

The lower surface 32 constitutes a fixation surface (a third fixation surface) for fixing the third rigid board 23. The third rigid board 23 is fixed to the lower surface 32 in a state in which the obverse mounting surface 231 faces to the support member 3 (inside). Specifically, the support member 3 has two screw holes 32a, 32b formed respectively in the two corner portions in the diagonal relationship of the lower surface 32. The holes (not shown) provided to the third rigid board 23 are aligned respectively to the screw holes 32a, 32b, and then fixed with the screws 81, 82 to thereby fix the third rigid board 23 to the lower surface 32.

Further, the support member 3 has a through hole 37 penetrating the upper surface 31 and the lower surface 32, and has a frame-shaped appearance. In a state in which the third rigid board 23 is fixed to the lower surface 32, the angular velocity sensor 413 and the acceleration sensor 42 both mounted on the obverse mounting surface 231 are housed in the through hole 37. In other words, the through hole 37 functions as a housing space for the angular velocity sensor 413 and the acceleration sensor 42, and makes a contribution to miniaturization and height reduction of the sensor 1. Further, the through hole 37 also functions as a clearance for preventing the angular velocity sensor 413 and the acceleration sensor 42 from having contact with the support member 3. By forming such a through hole 37 as described above, it is possible to effectively use the internal space of the support member 3, and at the same time achieve miniaturization (height reduction) of the sensor 1.

Upper Surface 31

The upper surface 31 constitutes a fixation surface for fixing the fourth rigid board 24. The fourth rigid board 24 is fixed to the upper surface 31 in a state in which the obverse mounting surface 241 faces to the support member 3 (inside). Specifically, the support member 3 has two screw holes 31a, 31b formed respectively in the two corner portions in the diagonal relationship of the upper surface 31. The holes (not shown) provided to the fourth rigid board 24 are aligned respectively to the screw holes 31a, 31b, and then fixed with the screws 83, 84 to thereby fix the fourth rigid board 24 to the upper surface 31.

Further, as described above, the support member 3 has the through hole 37. In a state in which the fourth rigid board 24 is fixed to the upper surface 31, the microcontroller (not shown) mounted on the obverse mounting surface 241 is housed in the through hole 37. Further, the through hole 37 also functions as a clearance for preventing the microcontroller from having contact with the support member 3. By forming such a through hole 37 as described above, it is possible to effectively use the internal space of the support member 3, and at the same time achieve miniaturization (height reduction) of the sensor 1.

Further, the constituent material of the support member 3 is not particularly limited, but is preferably a hard material in order to prevent deformation in the case in which, for example, a pressure is applied externally. Thus, it is possible to surely maintain the state in which the lower surface 32 and the side surfaces 33, 34 are perpendicular to each other, and it is possible to maintain the detection accuracy of the sensor 1 at a high level.

Such a material is not particularly limited, and there can be cited a variety of metals such as iron, nickel, copper, and aluminum, alloys and intermetallic compounds including at least one of these metals, and further, oxides of these metals. Among the above, as the alloys, there can be cited, for example, stainless steel, an inconel alloy, and other aluminum alloys such as duralumin.

By configuring the support member 3 with the metal material in such a manner as described above, the following advantages can be obtained. That is, in the case of configuring the support member 3 with a material having a high electrical conductivity such as a metal material, it is possible to block the radiation noise generated by the microcontroller and so on using the support member 3. Therefore, it is possible to prevent such radiation noise from reaching the angular velocity sensors 411, 412 in the clearances 331, 341, and exerting a harmful influence on these sensors. As a result, the angular velocity sensors 411, 412 can accurately detect the angular velocity.

Further, besides the metal materials described above, there can be cited as the hard material, for example, polyolefin such as polyethylene, polypropylene, or ethylene-propylene copolymer, polyvinyl chloride, polystyrene, polyamide, polyimide, polycarbonate, poly-(4-methylpentene-1), ionomer, acrylic resin, polymethylmethacrylate, acrylonitrile-butadiene-styrene copolymer (ABS resin), acrylonitrile-styrene copolymer (AS resin), butadiene-styrene copolymer, polyester such as polyethylene terephthalate (PET), or polybutylene terephthalate (PBT), polyether, polyetherketone (PEK), polyether ether ketone (PEEK), polyetherimide, polyacetal (POM), polyphenylene oxide, polysulfone, polyethersulfone, polyphenylene sulfide, polyarylate, aromatic polyester (liquid crystal polymer), fluorinated resin such as polytetrafluoroethylene or polyvinylidene fluoride, epoxy resin, phenol resin, urea resin, melamine resin, silicone resin, polyurethane, and so on, copolymers, polymer blends, and polymer alloys having any one of these compounds as the primary constituent, and these materials can be used alone or in combination.

Further, as the constituent material of the support member 3, an elastic material capable of exerting a vibration absorption or vibration isolation function for absorbing unwanted vibrations is also preferable. As such a material, there can be cited, for example, a variety of types of rubber materials (in particular those vulcanized) such as natural rubber, isoprene rubber, butadiene rubber, styrene-butadiene rubber, nitrile rubber, chloroprene rubber, butyl rubber, acrylic rubber, ethylene-propylene rubber, silicone rubber, and fluorine-contained rubber, and a variety of types of thermoplastic elastomers such as a styrene elastomer, a polyolefin elastomer, a polyvinyl chloride elastomer, a polyurethane elastomer, a polyester elastomer, a polyamide elastomer, a polybutadiene elastomer, a trans-polyisoprene elastomer, a fluorine-contained rubber based elastomer, and a chlorinated polyethylene elastomer, and these materials can be used alone or in combination.

Further, it is also preferable to use vibration isolation steel as the constituent material of the support member 3 in order to achieve both of the deformation resistance and the vibration absorption or vibration isolation function.

In the sensor 1 explained hereinabove, the support member 3 has the three surfaces perpendicular to each other, namely the lower surface 32 and the side surfaces 33, 34, the third rigid board 23 on which the angular velocity sensor 413 is mounted is fixed to the lower surface 32, the first rigid board 21 on which the angular velocity sensor 411 is mounted is fixed to the side surface 33, and the second rigid board 22 on which the angular velocity sensor 412 is mounted is fixed to the side surface 34. Only by fixing the mounting boards to the support member 3 in such a manner as described above, the three angular velocity sensors 411 through 413 can easily and surely be arranged so as to be perpendicular to each other. Therefore, according to the sensor 1, the angular velocities around the x axis, the y axis, and the z axis can respectively be detected with accuracy. In other words, the three angular velocity sensors 411 through 413 can be arranged so that the detection axis A1 of the angular velocity sensor 411 is parallel to the x axis, the detection axis A2 of the angular velocity sensor 412 is parallel to the y axis, and the detection axis A3 of the angular velocity sensor 413 is parallel to the z axis.

Further, the angular velocity sensors 411 through 413 and the acceleration sensor 42 are located between the respective rigid boards 21 through 25 and the support member 3. Therefore, the first rigid board 21 prevents the angular velocity sensor 411 from being exposed to the outside of the sensor 1, the second rigid board 22 prevents the angular velocity sensor 412 from being exposed to the outside of the sensor 1, and the third rigid board 23 prevents the angular velocity sensor 413 from being exposed to the outside of the sensor 1.

According to such an arrangement as described above, there is no chance for the angular velocity sensors 411 through 413 and the acceleration sensor 42 to have contact with the operator, the manufacturing equipment, and so on when, for example, manufacturing the sensor 1 or mounting the sensor 1 into other electronic apparatuses, and thus, the damage of these sensors can effectively be prevented. Further, as described above, since the ground layer provided to each of the rigid boards 21 through 25 is capable of blocking the external magnetic field, there is no chance for the angular velocity sensors 411 through 413 and the acceleration sensor 42 to be affected by the magnetic field, and the angular velocities and the acceleration can accurately be detected by these sensors.

In particular, since the sensor components 4 (the angular velocity sensors 411 through 413 and the acceleration sensor 42) are easily damaged, and easily affected by the magnetic field, by arranging these sensor components 4 as described above, both of the reliability and the detection characteristics of the sensor 1 can be improved.

It should be noted that the arrangement of the plurality of sensor components 4 is not particularly limited providing at least one of the sensor components 4 is located between any of the rigid boards 21 through 25 and the support member 3. For example, it is also possible that all of the sensor components 4 except the connector 49 are mounted on the obverse mounting surfaces 211 through 251 of the rigid boards 21 through 25, and are located between the rigid boards 21 through 25 and the support member 3.

Further, although in the support member 3 described above, the explanation is presented using the configuration in which at least the lower surface 32, the side surface 33, and the side surface 34 are formed accurately so as to have the respective normal lines perpendicular to each other, the invention is not limited to this configuration. It is also possible to adopt a configuration in which the lower surface 32, the side surfaces 33, 34, 35, and 36, and the upper surface 31 intersect with each other. Even in such a configuration as described above, the sensor components 4 can be arranged similarly to the above.

Second Embodiment

Figure 5:
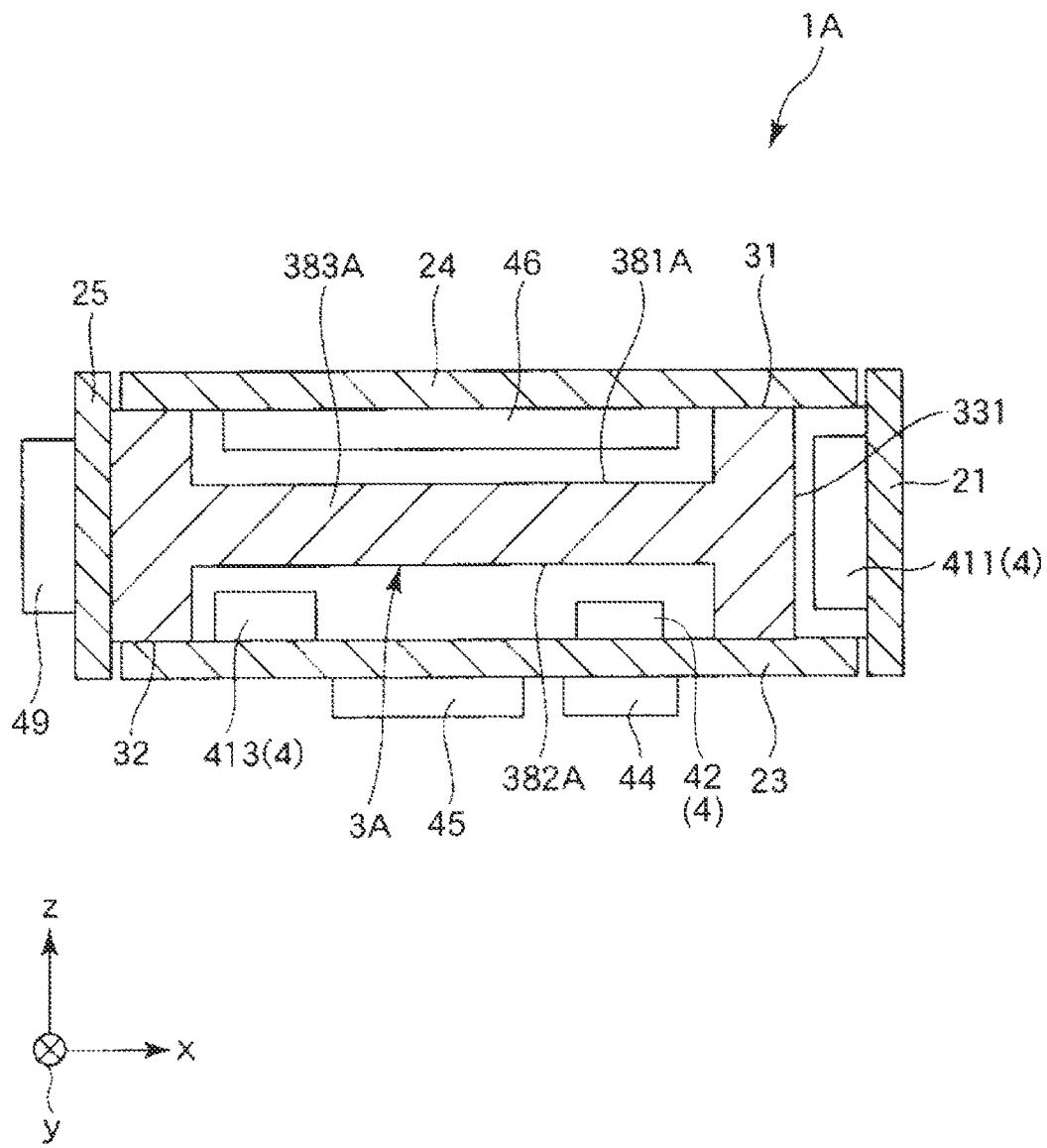
FIG. 5 is a cross-sectional view of a sensor showing a sensor according to a second embodiment of the invention.

FIG. 5 is a cross-sectional view showing a sensor according to a second embodiment of the invention. Hereinafter, the second embodiment will be described focused mainly on the differences from the embodiment described above, and the explanation of substantially the same matters will be omitted. The sensor according to the second embodiment of the invention is substantially the same as that of the first embodiment except the point that the configuration of the support member is different. It should be noted that the constituents substantially the same as those of the first embodiment described above are denoted with the same reference symbols.

As shown in FIG. 5, a support member 3A provided to a sensor 1A has a clearance (a recessed section) 381A disposed on the upper surface 31 and a clearance (a recessed section) 382A disposed on the lower surface 32. In other words, the support member 3A has a blocking section 383A for blocking the through hole 37 provided to the sensor 1 according to the first embodiment described above in the middle of the through hole 37, and has an H-shaped cross-section.

In a state in which the fourth rigid board 24 is fixed to the upper surface 31, the microcontroller 46 is housed in the clearance 381A. Further, it is possible to make the clearance 381A function as a clearance for preventing the support member 3A and a microcontroller 46 from having contact with each other. By forming such a clearance 381A as described above, it is possible to effectively use the internal space of the support member 3A, and at the same time achieve miniaturization (in particular height reduction) of the sensor 1A.

Further, in a state in which the third rigid board 23 is fixed to the lower surface 32, the angular velocity sensor 413 and the acceleration sensor 42 are housed in the clearance 382A. In other words, it is possible to make the clearance 382A function as a clearance for preventing the support member 3A, and the angular velocity sensor 413 and the acceleration sensor 42 from having contact with each other. By forming such a clearance 382A as described above, it is possible to effectively use the internal space of the support member 3A, and at the same time achieve miniaturization (in particular height reduction) of the sensor 1A.

It should be noted that it is also possible to bond top surfaces (surfaces on an opposite side to the surfaces mounted on the third rigid board 23) of the angular velocity sensor 413 and the acceleration sensor 42 to a surface of the clearance 382A of the support member 3A with an adhesive or the like. By adopting such a configuration as described above, tight bonding between the angular velocity sensor 413 and the acceleration sensor 42, and the support member 3A can be realized. Further, the other sensor components 4 are substantially the same as in the first embodiment described above although not shown in the drawings.

In such a support member 3A as described above, since the blocking section 383A functions as a reinforcement section for suppressing the deformation of the support member 3A, a configuration more difficult to deform is realized compared to, for example, the support member 3 of the first embodiment described above. Therefore, it is possible to surely maintain the state in which the angular velocity sensors 411 through 413 are perpendicular to each other, and thus superior detection characteristics can be exerted.

Further, in the present embodiment, the clearance 381A housing the microcontroller 46 is spatially separated from the clearances 331, 341, and 382A respectively housing the angular velocity sensors 411 through 413. Therefore, in the case of, for example, forming the support member 3A of a material having high electrical conductivity such as a metal material, the radiation noise generated by the microcontroller 46 can be blocked by the support member 3A, and thus, it is possible to prevent the radiation noise from reaching the angular velocity sensors 411 through 413, and exerting a harmful influence on the angular velocity sensors 411 through 413. As a result, the angular velocity sensors 411 through 413 can accurately detect the angular velocity.

Further, as shown in FIG. 5, it is possible for the first rigid board 21 not to be directly supported by the support member 3A, but to be supported using the side surfaces of the third rigid board 23 and the fourth rigid board 24. In this configuration, by setting the length in the x-axis direction of the third rigid board 23 and the fourth rigid board 24 to be greater than the length in the x-axis direction of the support member 3A, the space provided between the third rigid board 23 and the fourth rigid board 24 is made to function as the clearance. By adopting such a configuration as described above, the rigidity of the support member 3A can be increased to a level higher than in the case of forming the clearance in the sidewall of the support member 3A. It should be noted that this configuration can be applied not only to the present embodiment, but also to other embodiments.

Third Embodiment

Figure 6:
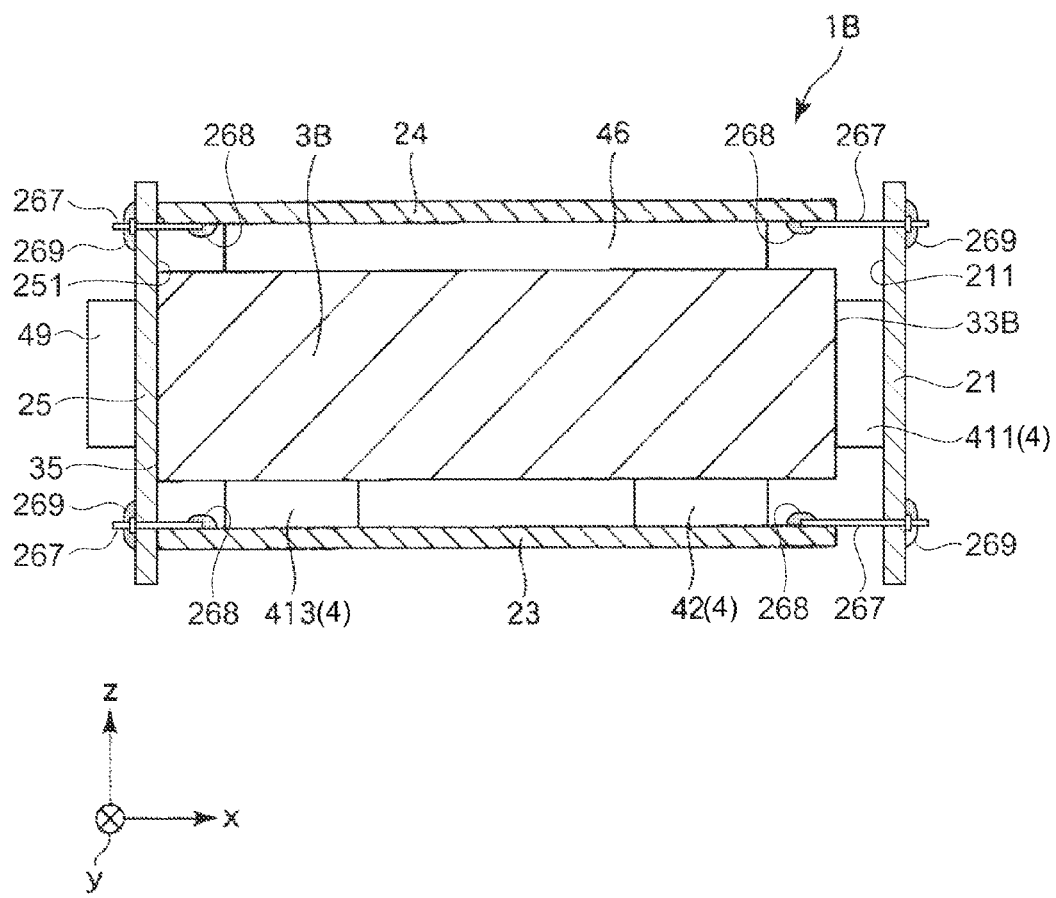
FIG. 6 is a cross-sectional view of a sensor showing a sensor according to a third embodiment of the invention.

FIG. 6 is a cross-sectional view showing a sensor according to a third embodiment of the invention. Hereinafter, the third embodiment will be described mainly focused on the differences from the embodiments described above, and the explanation of substantially the same matters will be omitted. The sensor according to the third embodiment of the invention is substantially the same as that of the first embodiment except the point that the configuration of the support member is different. It should be noted that the constituents substantially the same as those of the first embodiment described above are denoted with the same reference symbols.

As shown in FIG. 6, a support member 3B provided to a sensor 1B has a roughly cuboid block-like shape. Further, the mounting boards (the first rigid board 21 through the fifth rigid board 25) are disposed so as to cover the outer periphery of the support member 3B. In such a sensor 1B, the mounting boards are fixed to the support member 3B via the sensor components 4 mounted on the obverse mounting surfaces 211 through 251 of the mounting boards. In other words, the first rigid board 21 is fixed to the support member 3B by fixing the angular velocity sensor 411, which is mounted on the obverse mounting surface 211 of the first rigid board 21, to a side surface 33B of the support member 3B. The fixing of the angular velocity sensor 411 to the side surface 33B is not particularly limited, but can be performed, for example, using an adhesive. The same applies to other rigid boards, namely the second through fourth rigid boards 22 through 24. It should be noted that regarding the fifth rigid board 25, since the sensor component 4 is not mounted on the obverse mounting surface 251, the fifth rigid board 25 is directly fixed to the side surface 35.

In the present configuration, the electrical connection between the first rigid board 21, and the third rigid board 23 and the fourth rigid board 24 is achieved by soldering (268, 269) the pin headers 267 to the respective rigid boards. Further, the electrical connection between the fifth rigid board 25, and the third rigid board 23 and the fourth rigid board 24 is achieved by soldering (268, 269) the pin headers 267 to the respective rigid boards.

By using the support member 3B of the present configuration, it is possible to easily and conveniently form the support member 3B while keeping the rigidity of the support member 3B, it is possible to make a contribution to cost reduction of the sensor 1B, and it is possible to provide the sensor 1B low in price.

Although in the sensors according to the embodiments described above, the explanation is presented citing an example of using the plurality of rigid boards 21 through 25, and arranging the angular velocity sensors 411, 412, and 413 as the three sensor components 4 on the support member 3 side, the number of the sensor components 4 is not limited to three. For example, a single-axis gyro sensor using a single sensor component can also be adopted, or a two-axis gyro sensor using two sensor components can also be adopted.

Even in the single-axis gyro sensor using the single sensor component, or the two-axis gyro sensor using two sensor components, substantially the same advantages as in the embodiments described above can be obtained. There is no chance for the angular velocity sensors to have contact with the operator, the manufacturing equipment, and so on when, for example, manufacturing the sensor or mounting the sensor into other electronic apparatuses, and thus, the damage of these sensors can effectively be prevented. Further, as described above, since the ground layer provided to each of the rigid boards is capable of blocking the external magnetic field, there is no chance for the angular velocity sensors 411 through 413 to be affected by the magnetic field, and the angular velocities and the acceleration can accurately be detected by these sensors.

2. Electronic Apparatus

Figure 7:
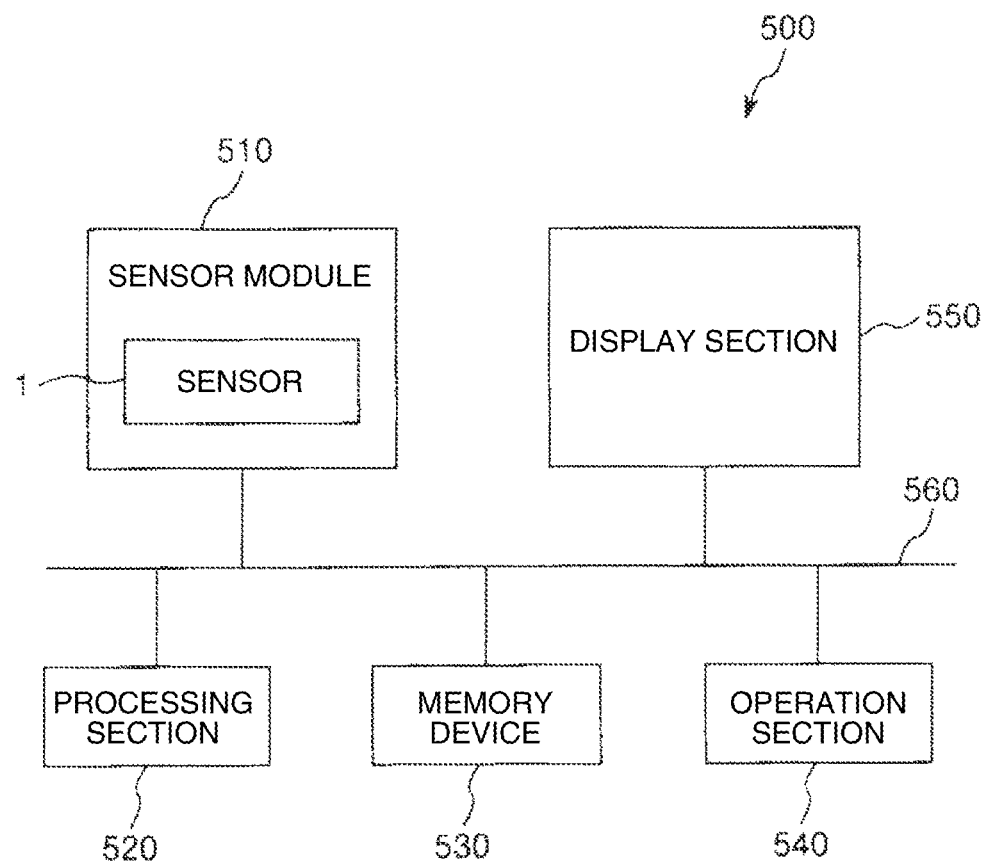
FIG. 7 is a diagram showing an example of a configuration of an electronic apparatus equipped with the sensor.

The sensor 1 (the same applies to the sensors 1A, 1B) described above can be incorporated in a variety of electronic apparatuses. A schematic configuration of the electronic apparatus equipped with the sensor 1 will hereinafter be explained. FIG. 7 is a diagram showing an example of a schematic configuration of an electronic apparatus 500 equipped with the sensor 1.

The electronic apparatus 500 shown in FIG. 7 includes a sensor module 510 provided with the sensor 1, a processing section 520, a memory device 530, an operating section 540, and a display section 550. These constituents are connected to each other via a bus 560. The processing section (e.g., a CPU and an MPU) 520 performs the control of the sensor module 510 and so on and the overall control of the electronic apparatus 500. Further, the processing section 520 performs the process based on the angular velocity information detected by the sensor module 510. For example, the processing section 520 performs the process for blurring correction, posture control, and GPS autonomous navigation based on the angular velocity information. The memory device 530 stores the control program and a variety of data, and further, functions as a working area and a data storage area. The operating section 540 is for the user to operate the electronic apparatus 500. The display section 550 is for displaying a variety types of information to the user.

Then, specific examples of the electronic apparatuses to which the sensor 1 (the same applies to the sensors 1A, 1B) according to the embodiment of the invention will be explained in detail with reference to FIGS. 8 through 10. It should be noted that in the explanation, an example of applying the sensor 1 is described.

Figure 8:
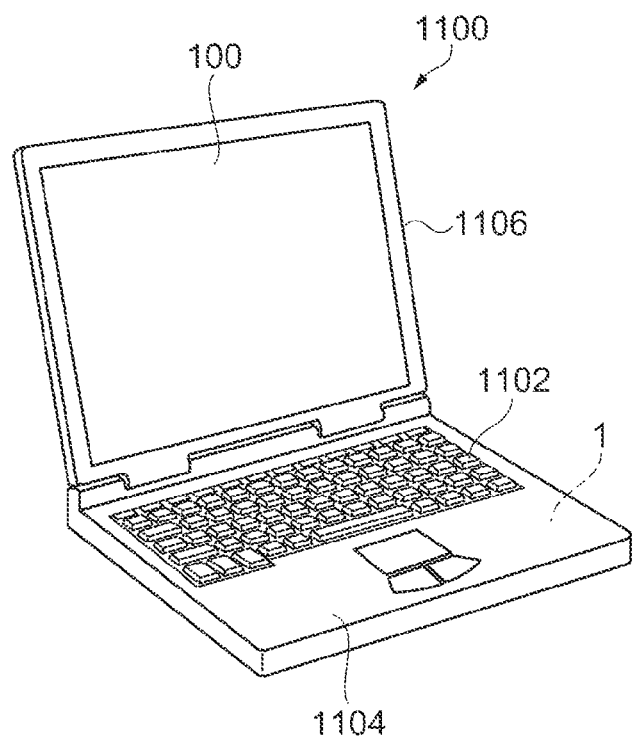
FIG. 8 is a perspective view showing a configuration of a mobile personal computer as an example of the electronic apparatus.

FIG. 8 is a perspective view showing a schematic configuration of a mobile type (or a laptop type) personal computer as the electronic apparatus equipped with the sensor 1 according to the embodiment of the invention. In the drawing, a personal computer 1100 includes a main body section 1104 provided with a keyboard 1102, and a display unit 1106 provided with a display section 100, and the display unit 1106 is pivotally supported with respect to the main body section 1104 via a hinge structure. Such a personal computer 1100 incorporates the sensor 1 using the gyro element 5 provided with the function of detecting the angular velocity.

Figure 9:
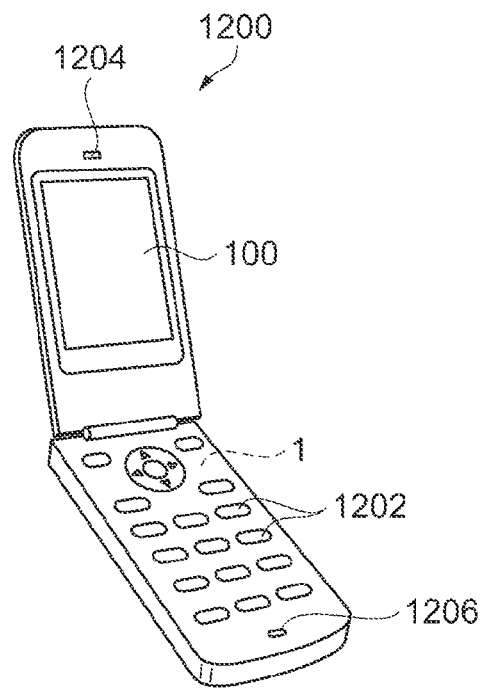
FIG. 9 is a perspective view showing a configuration of a cellular phone as an example of the electronic apparatus.

FIG. 9 is a perspective view showing a schematic configuration of a cellular phone (including PHS) as the electronic apparatus equipped with the sensor 1 according to the embodiment of the invention. In this drawing, a cellular phone 1200 is provided with a plurality of operation buttons 1202, an ear piece 1204, and a mouthpiece 1206, and the display section 100 is disposed between the operation buttons 1202 and the ear piece 1204. Such a cellular phone 1200 incorporates the sensor 1 using the gyro element 5 functioning as an angular velocity sensor or the like.

Figure 10:
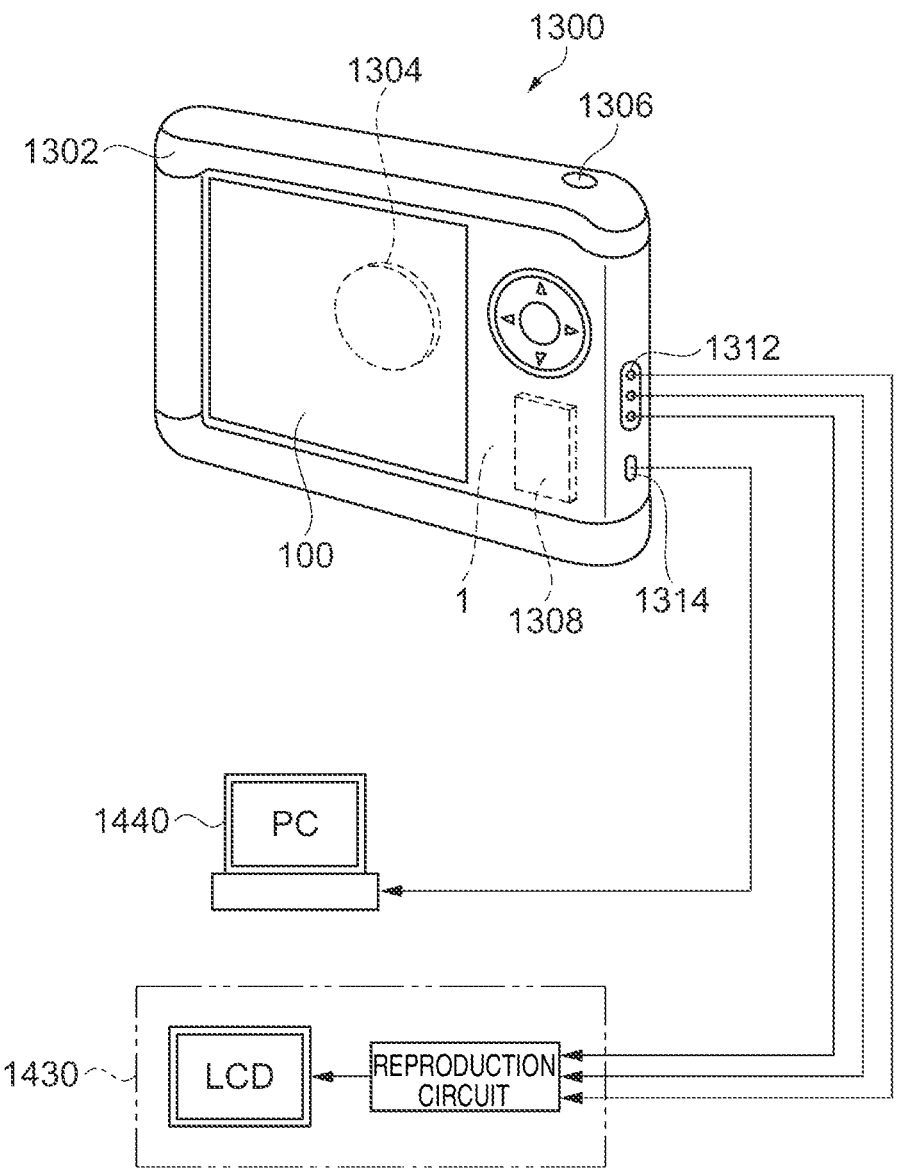
FIG. 10 is a perspective view showing a configuration of a digital still camera as an example of the electronic apparatus.

FIG. 10 is a perspective view showing a schematic configuration of a digital still camera as the electronic apparatus equipped with the sensor 1 according to the embodiment of the invention. It should be noted that the connection with external equipment is also shown briefly in this drawing. Here, an ordinary camera exposes a silver salt film to an optical image of an object, while a digital still camera 1300 performs photoelectric conversion on an optical image of an object by an imaging element such as a CCD (a charge coupled device) to generate an imaging signal (an image signal).

A case (a body) 1302 of the digital still camera 1300 is provided with the display section 100 disposed on the back surface of the case (the body) 1302 to provide a configuration of performing display in accordance with the imaging signal from the CCD, wherein the display section 100 functions as a viewfinder for displaying the object as an electronic image. Further, the front surface (the reverse side in the drawing) of the case 1302 is provided with a light receiving unit 1304 including an optical lens (an imaging optical system), the CCD, and so on.

When the photographer checks an object image displayed on the display section 100, and then holds down a shutter button 1306, the imaging signal from the CCD at that moment is transferred to and stored in a memory device 1308. Further, the digital still camera 1300 is provided with video signal output terminals 1312 and an input/output terminal 1314 for data communication disposed on a side surface of the case 1302. Further, as shown in the drawing, a television monitor 1430 and a personal computer (PC) 1440 are respectively connected to the video signal output terminals 1312 and the input/output terminal 1314 for data communication if needed. Further, there is adopted the configuration in which the imaging signal stored in the memory device 1308 is output to the television monitor 1430 and the personal computer 1440 in accordance with a predetermined operation. Such a digital still camera 1300 incorporates the sensor 1 using the gyro element 5 functioning as an angular velocity sensor or the like.

It should be noted that, the sensor 1 according to the embodiment of the invention can also be applied to, for example, an electronic apparatus such as an inkjet ejection device (e.g., an inkjet printer), a laptop type personal computer, a television set, a video camera, a video cassette recorder, a car navigation system, a pager, a personal digital assistance (including one with a communication function), an electronic dictionary, an electric calculator, a computerized game machine, a word processor, a workstation, a video phone, a security video monitor, a pair of electronic binoculars, a POS terminal, a medical device (e.g., an electronic thermometer, an electronic manometer, an electronic blood sugar meter, an electrocardiogram measurement instrument, an ultrasonograph, and an electronic endoscope), a fish detector, various types of measurement instruments, various types of gauges (e.g., gauges for a vehicle, an aircraft, or a ship), and a flight simulator besides the personal computer (the mobile type personal computer) shown in FIG. 8, the cellular phone shown in FIG. 9, and the digital still camera shown in FIG. 10.

Although the sensor and the electronic apparatus according to the invention are hereinabove described based on the embodiments shown in the accompanying drawings, the invention is not limited to the embodiments, but the configuration of each of the constituents can be replaced with one having an arbitrary configuration with an equivalent function. Further, it is possible to add any other components to the invention. Further, it is also possible to suitably combine any of the embodiments.

3. Moving Object

Figure 11:
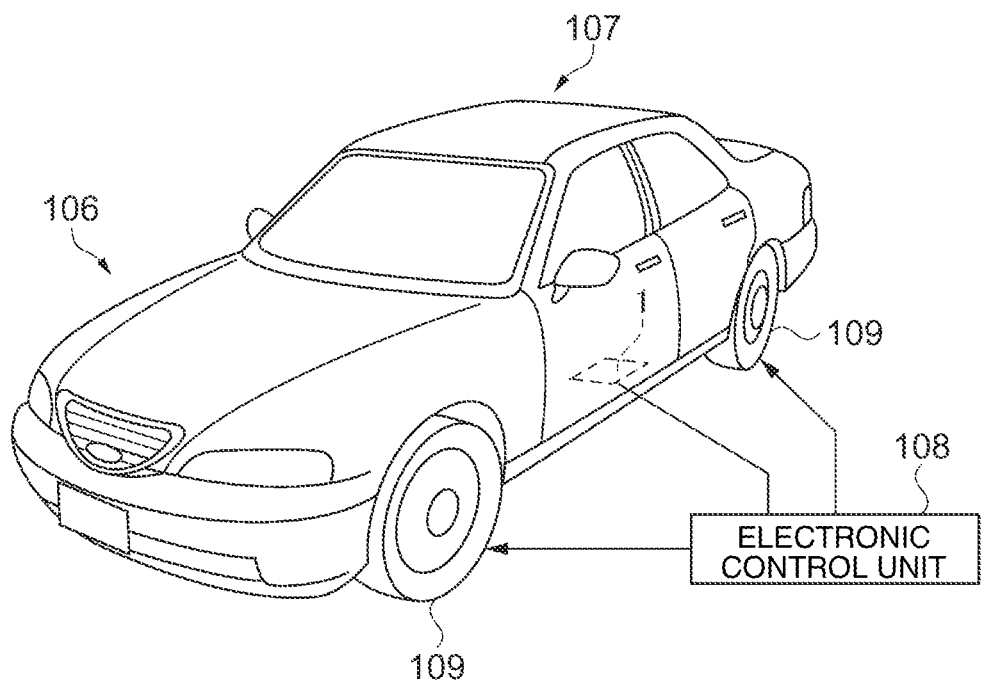
FIG. 11 is a perspective view showing a configuration of a vehicle as an example of a moving object.

FIG. 11 is a perspective view schematically showing a vehicle as an example of the moving object. A vehicle 106 is equipped with the sensor 1 using the gyro element 5 according to the embodiments described above. For example, as shown in the drawing, in the vehicle 106 as the moving object, an electronic control unit 108 incorporating the sensor 1 using the gyro element 5 and for controlling tires 109 and so on is installed in a vehicle body 107. Further, besides the above, the sensor 1 can widely be applied to an electronic control unit (ECU) such as a keyless entry system, an immobilizer, a car navigation system, a car air-conditioner, an anti-lock braking system (ABS), an air-bag system, a tire pressure monitoring system (TPMS), an engine controller, a battery monitor for a hybrid car or an electric car, or a vehicle posture control system.

It should be noted that although in the embodiments described above, the example in which the first fixation surface (the side surface 33) of the support member 3 and the normal line of the second fixation surface (the side surface 34) are perpendicular to each other is explained, the invention is not necessarily limited to this configuration. It is also possible to, for example, provide the support member with a trigonal pyramid shape or a square pyramid shape, and dispose the mounting boards along the side surfaces of the trigonal pyramid or the square pyramid.

Further, although in the embodiments described above, the explanation is presented using the example of achieving the connection using the pin headers 267 between the rigid boards 21 through 25, the invention is not necessarily limited to this configuration. It is also possible to achieve the connection using, for example, a method of using lead wires for the connection between the rigid boards 21 through 25, or a method of using lead boards (flexible wiring boards) therefor.

The entire disclosure of Japanese Patent Application No. 2012-284512, filed Dec. 27, 2012 is expressly incorporated by reference herein.

What is claimed is:

1. A sensor comprising:
a first rigid board having a first mounting surface on which a first sensor component is mounted;
a second rigid board having a second mounting surface on which a second sensor component is mounted, the second rigid board having a first side surface that is continuously formed from the second mounting surface;
a first connection member that connects the first and second rigid boards so that the first side surface of the second rigid board faces the first mounting surface of the first rigid board; and
a support member having first and second fixation surfaces, wherein
the first rigid board is fixed to the first fixation surface via the first sensor component so that the first rigid board and the first fixation surface sandwich the first sensor component therebetween, and
the second rigid board is fixed to the second fixation surface via the second sensor component so that the second rigid board and the second fixation surface sandwich the second sensor component therebetween.

2. The sensor according to claim 1, wherein
the first and second fixation surfaces intersect with each other.

3. The sensor according to claim 1, wherein
the support member has a cuboid shape.

4. The sensor according to claim 1, wherein
the support member is provided with a component housing section, and
the component housing section houses at least a part of the first and second sensor components.

5. The sensor according to claim 1, wherein
a metal material is used for the support member.

6. The sensor according to claim 1, further comprising:
a third rigid board having a third mounting surface on which a third sensor component is mounted; and
a second connection member that connects the second and third rigid boards, wherein
the second rigid board has a second side surface that is continuously formed from the second mounting surface,
the second side surface of the second rigid board faces the third mounting surface of the third rigid board,
the support member has a third fixation surface,
the third rigid board is fixed to the third fixation surface via the third sensor component so that the third rigid board and the third fixation surface sandwich the third sensor component therebetween, and
first through third detection axes of the first through third sensor components intersect with each other.

7. The sensor according to claim 1, wherein
each of the first and second sensor components is one of an angular velocity sensor and an acceleration sensor.

8. An electronic apparatus comprising:
the sensor according to claim 1.

9. A moving object comprising:
the sensor according to claim 1.

10. The sensor according to claim 1, wherein
the first rigid board has a insertion hole, and
the first connection member is conductive and inserted into the insertion hole.

11. The sensor according to claim 1, wherein
the first rigid board has a plurality of insertion holes,
the first connection member is configured with a plurality of metal pins,
the plurality of metal pins are inserted into the plurality of insertion holes, respectively so that ends of the plurality of metal pins align on the second mounting surface in the vicinity of the first side surface of the second rigid board.

\* \* \* \* \*